(12) United States Patent
Moore et al.

(10) Patent No.: US 10,424,904 B2
(45) Date of Patent: Sep. 24, 2019

(54) METHOD AND APPARATUS FOR REPAIR OF RADIAL DEFORMATION OF MULTI-STRAND WIRE

(71) Applicant: Hard Hat Ventures, LLC, Atoka, OK (US)

(72) Inventors: Stephen W. Moore, Atoka, OK (US); John F. Probst, Cheney, WA (US)

(73) Assignee: Hard Hat Ventures, LLC, Atoka, OK (US)

( * ) Notice: Subject to any disclaimer, the term of this patent is extended or adjusted under 35 U.S.C. 154(b) by 530 days.

(21) Appl. No.: 15/227,397

(22) Filed: Aug. 3, 2016

(65) Prior Publication Data

US 2017/0040780 A1 Feb. 9, 2017

Related U.S. Application Data

(60) Provisional application No. 62/200,315, filed on Aug. 3, 2015.

(51) Int. Cl.
*B21D 3/02* (2006.01)
*H02G 1/00* (2006.01)

(52) U.S. Cl.
CPC ............... *H02G 1/00* (2013.01); *B21D 3/02* (2013.01)

(58) Field of Classification Search
CPC .... B21D 3/02; B21D 3/04; B21D 3/05; B21F 1/02; H02G 1/00
See application file for complete search history.

(56) References Cited

U.S. PATENT DOCUMENTS

| 2,293,156 A | * | 8/1942 | Mason | ..................... B21D 3/05 72/162 |
| 2,647,699 A |   | 8/1953 | Bush  |                                        |

(Continued)

FOREIGN PATENT DOCUMENTS

| CN | 201339140 | 11/2009 |
| CN | 102359028 | 2/2012  |

(Continued)

OTHER PUBLICATIONS

International Search Report and Written Opinion of the International Searching Authority (PCT/US2016/045331); dated Nov. 9, 2016.

*Primary Examiner* — Edward T Tolan
(74) *Attorney, Agent, or Firm* — Dunlap Codding, P.C.

(57) ABSTRACT

Apparatuses and methods for correcting radial deformation in multi-strand wire, including a method comprising obtaining an apparatus comprising a base and a first and second roller rotatably attached to the base and laterally aligned with and laterally offset from one another, wherein each of the first and second rollers has an annular groove with a concave configuration; positioning the apparatus on a radially deformed multi-strand wire suspended between two support members such that the multi-strand wire is positioned substantially linearly in the lateral offset between the first and second rollers; and moving the apparatus over the radially deformed multi-strand wire such that a first side of the multi-strand wire is received in the groove of the first roller and a second side of the multi-strand wire is received in the groove of the second roller whereby the length of radially deformed multi-strand wire is reformed.

18 Claims, 8 Drawing Sheets

(56) References Cited

U.S. PATENT DOCUMENTS

| | | | | |
|---|---|---|---|---|
| 3,893,316 | A * | 7/1975 | Simich | A01F 15/12 140/140 |
| 4,005,592 | A * | 2/1977 | Haeussler | B21F 1/02 72/165 |
| 4,191,041 | A | 3/1980 | Brauer et al. | |
| 4,283,930 | A | 8/1981 | Hasegawa et al. | |
| 4,829,801 | A * | 5/1989 | McRaine | B21D 3/05 72/164 |
| 5,014,533 | A | 5/1991 | Anagnostopoulos | |
| 5,044,187 | A * | 9/1991 | King | B21D 3/05 72/175 |
| 5,392,624 | A | 2/1995 | Properzi | |
| 5,676,009 | A * | 10/1997 | Bright | B21D 3/05 72/161 |
| 5,676,010 | A | 10/1997 | College et al. | |
| 5,744,955 | A | 4/1998 | Booker | |
| 7,024,752 | B2 * | 4/2006 | Inngrut | H01R 43/0486 29/448 |
| 8,763,436 | B2 * | 7/2014 | Knewtson | B21F 1/023 140/147 |
| 8,783,085 | B2 * | 7/2014 | Kuroiwa | B21D 3/04 72/235 |
| 9,643,227 | B2 * | 5/2017 | Del Fabro | B21D 3/02 |
| 2010/0095727 | A1 * | 4/2010 | Boeuf | B21D 1/02 72/206 |
| 2012/0160897 | A1 | 6/2012 | Enyedy | |

FOREIGN PATENT DOCUMENTS

| | | |
|---|---|---|
| CN | 202139497 | 2/2012 |
| CN | 203530756 | 4/2014 |
| GB | 561859 | 6/1944 |
| KR | 20-2009-0003732 | 4/2009 |

* cited by examiner

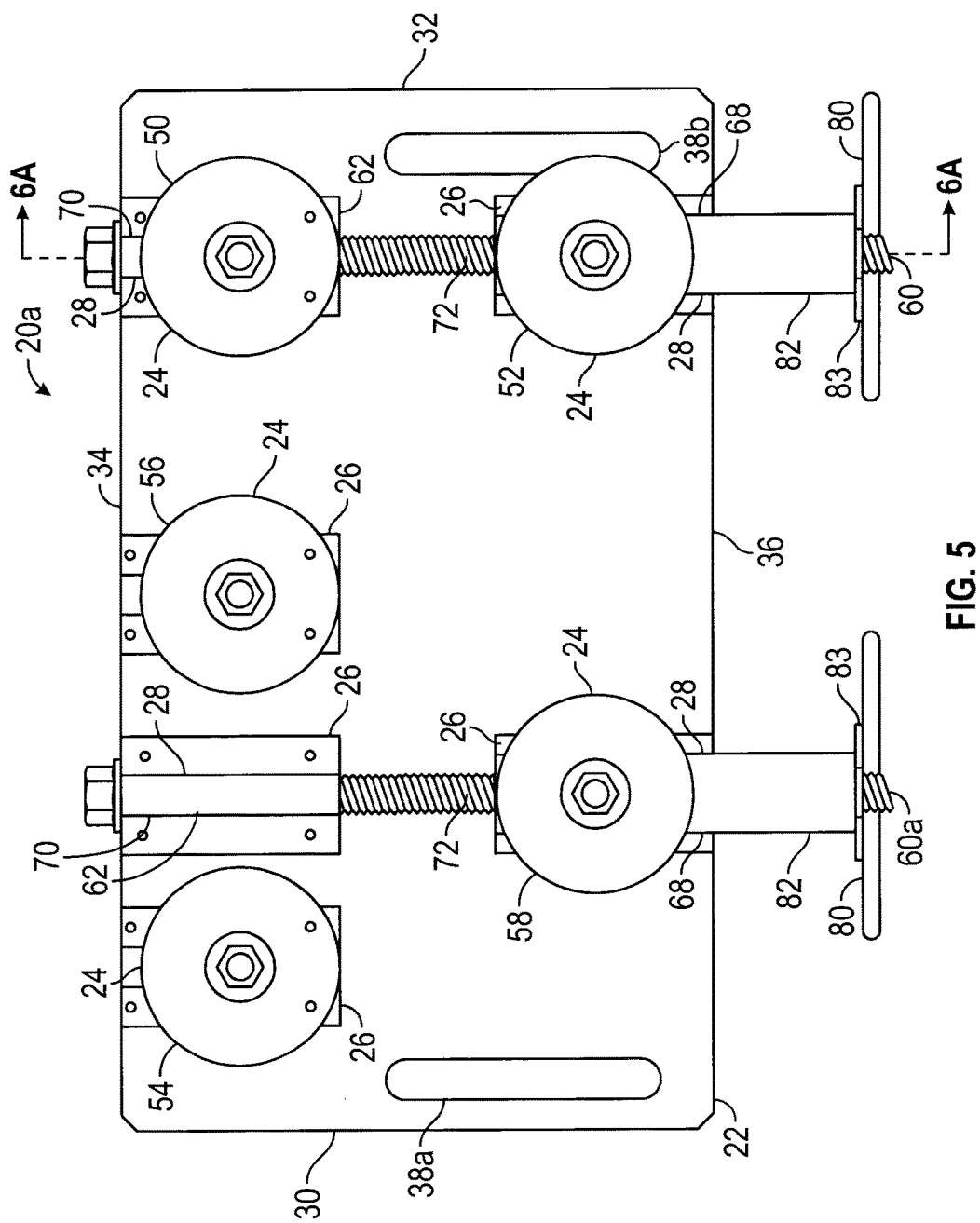

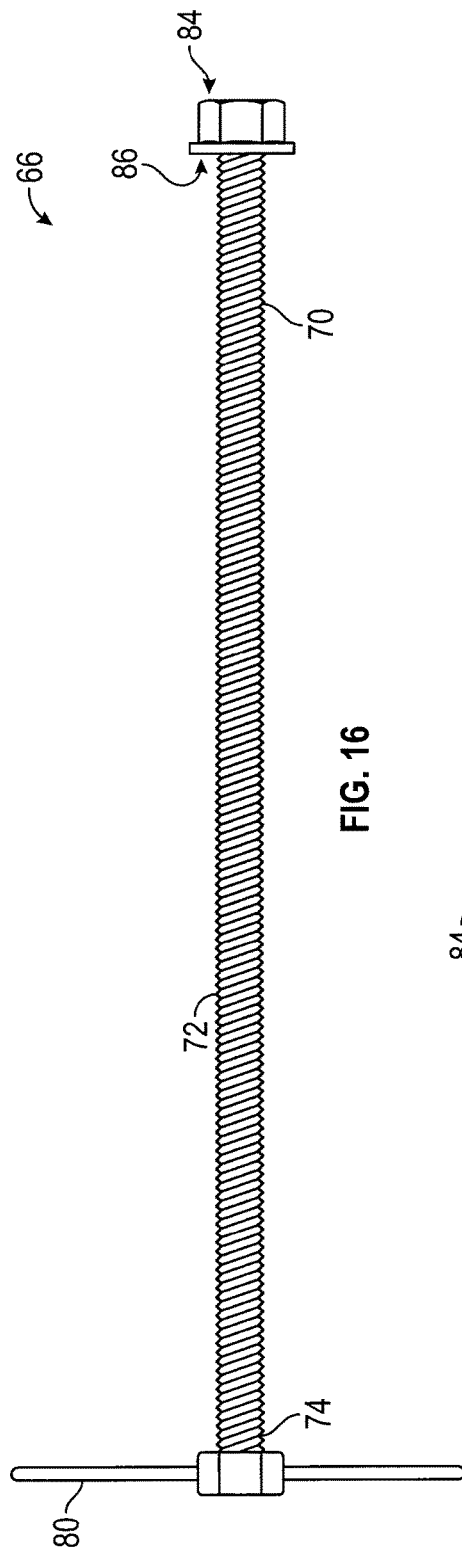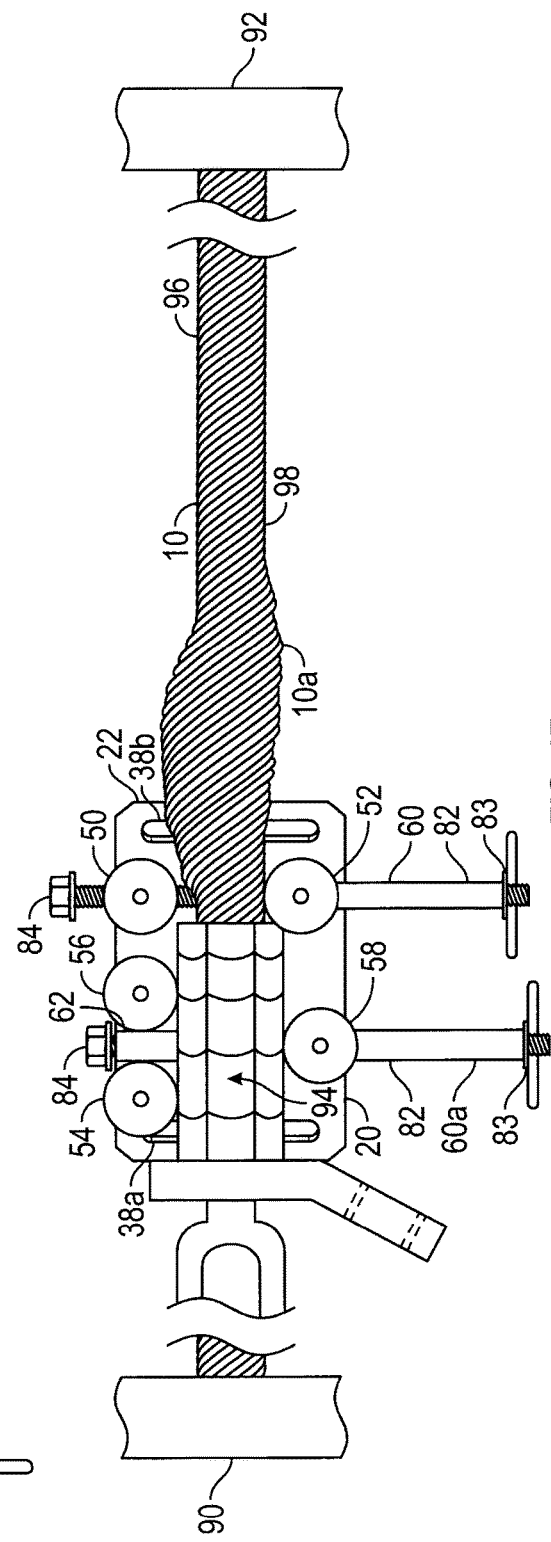

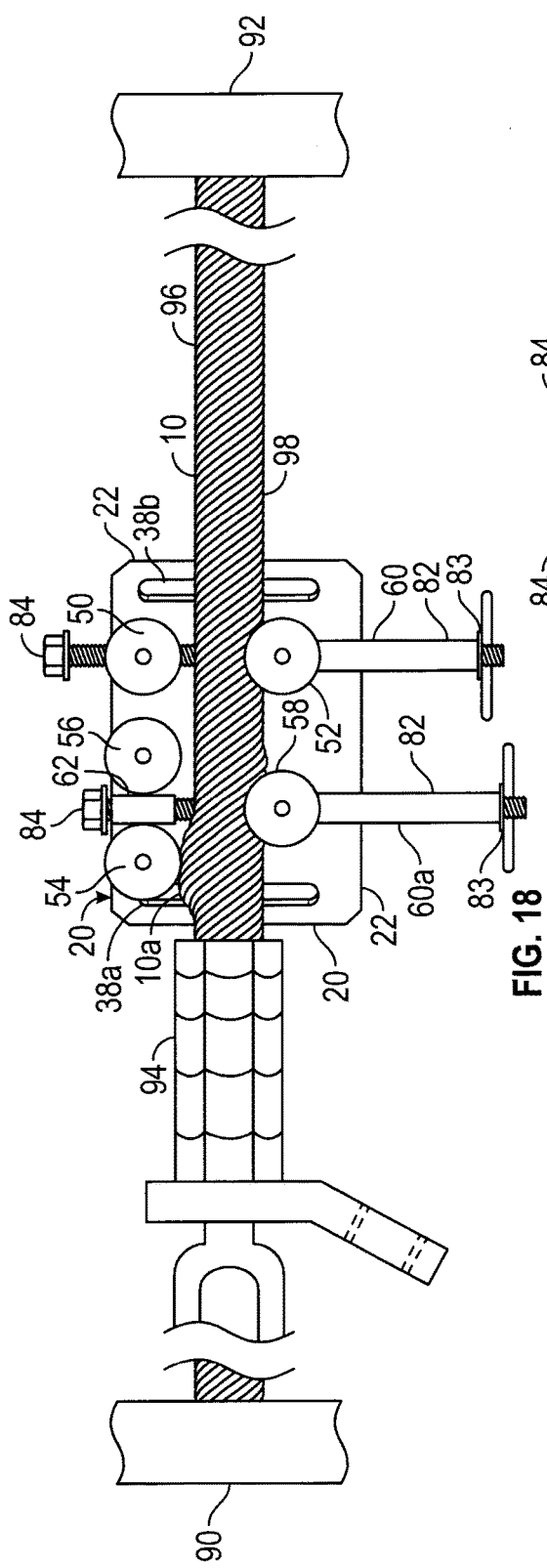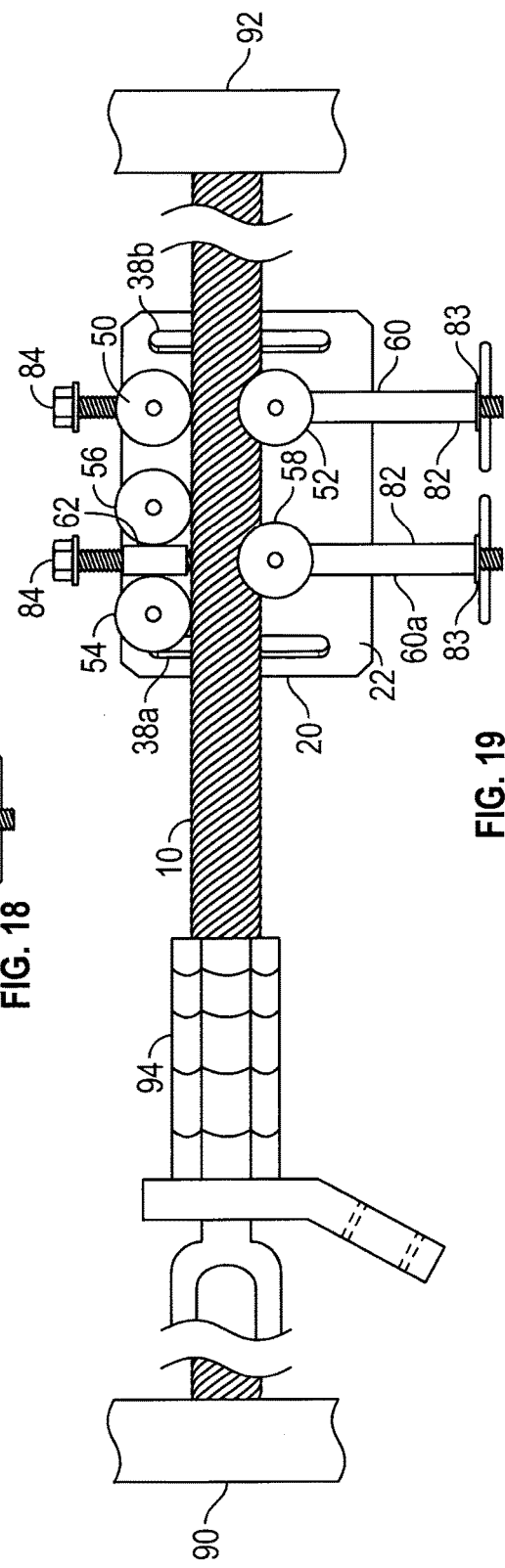

METHOD AND APPARATUS FOR REPAIR OF RADIAL DEFORMATION OF MULTI-STRAND WIRE

CROSS-REFERENCE TO RELATED APPLICATION

This application claims priority to U.S. Provisional Ser. No. 62/200,315, filed on Aug. 3, 2015, the entire contents of which being hereby expressly incorporated herein by reference.

BACKGROUND

Multi-strand wire, such as high-voltage transmission wire, may be affected by defects known as "bird cage" defects, or "bird caging". Bird caging in relation to wire defects typically refers to buckling of tensile armor wire strands of the multi-strand wire, resulting in an increase in radial deformation in pitch, shape, and/or circular diameter. This type of defect may cause problems in use of the multi-strand wire. For example, in power transmission applications, bird caging of electrical transmission lines may result in loss of voltage, wasted power, and even arc or flash-over resulting in power outages.

Bird caging may be caused by many factors, including, but not limited to, extreme axial compression (such as squeezing dead ends, compression fittings, in line sleeves, using 60 to 100 ton press heads), improper crimping of compression connecters, extreme bends in the wire, improper wire handling, ice buildup (expanding and separating strands of the wire), extreme heat, or lightning strikes.

Additionally, deformation of strands of the multi-strand wire may also be caused by roll-out of strands of the multi-strand wire from bad blocks, rollers, travelers, grounds, hoists, and/or slings.

Currently, if a bird cage or other deformation defect is found, operators typically attempt to hammer or press the strands back into the desired shape while the wire is in a suspended and/or connected state. If the deformation cannot be corrected, the multi-strand wire must be disconnected from support towers, removed, and replaced. In power transmission applications, this may mean that entire stretches of transmission line must be replaced and re-strung, at great expense of materials and labor.

To this end, a need exists for an apparatus and method for correcting deformation of multi-strand wire. It is to such apparatus and method that the inventive concepts disclosed herein are directed.

SUMMARY

Apparatuses and methods are disclosed including some embodiments of an exemplary apparatus for correcting deformation of multi-strand wire, comprising an electrically non-conductive base having a first end, a second end, and a first side and a second side extending between the first end and the second end. The apparatus may have a stationary sleeve connected to the base and positioned proximate to the first side of the base and having a threaded through-hole and a moveable sleeve positioned between the stationary sleeve and the second side of the base and having a through-hole. The apparatus may further include a screw member having a first end engageable with the threaded through-hole of the stationary sleeve, a middle portion positioned through the through-hole of the moveable sleeve, and a second end having an adjustment handle, such that the lateral position of the moveable sleeve is adjustable in relation to the stationary sleeve when the first portion of the screw member is screwed in the threaded through-hole of the stationary sleeve via rotation of the adjustment handle. The apparatus has a first roller rotatably connected to the stationary sleeve, the first roller having an outer diameter with an annular groove having a concave configuration; and a second roller rotatably connected to the moveable sleeve and laterally aligned with and laterally offset from the first roller, the second roller having an outer diameter with an annular groove having a concave configuration. A radially deformed multi-strand wire may be re-formed when the first roller is rolled over a first side of the radially deformed multi-strand wire and the second is rolled over a second side of the radially deformed multi-strand wire.

In some embodiments, the stationary sleeve is a first stationary sleeve, the moveable sleeve is a first moveable sleeve, and the screw member is a first screw member. Such embodiments may further comprise a third roller having an outer diameter with an annular groove having a concave configuration and rotatably connected to the base proximate to the first side of the base; and a fourth roller having an outer diameter with an annular groove having a concave configuration and rotatably connected to the base and substantially longitudinally aligned with the third roller proximate to the first side of the base. The apparatus may have a second stationary sleeve connected to the base and positioned proximate to the first side of the base and between the third roller and the fourth roller and having a threaded through-hole; a second moveable sleeve positioned between the second stationary sleeve and the second side of the base and having a through-hole; and a second screw member having a first end engageable with the threaded through-hole of the second stationary sleeve, a middle portion positioned through the through-hole of the second moveable sleeve, and a second end having an adjustment handle, such that the lateral position of the second moveable sleeve is adjustable in relation to the second stationary sleeve when the first portion of the screw member is screwed through the threaded through-hole of the second stationary sleeve via rotation of the adjustment handle. Further, the apparatus may have a fifth roller having an outer diameter with an annular groove having a concave configuration and rotatably connected to the second moveable sleeve, the fifth roller positioned between and laterally offset from the third roller and the fourth roller. The third roller and the fourth roller may be moved over the first side of the radially deformed multi-strand wire while the fifth roller may be moved over the second side of the radially deformed multi-strand wire.

BRIEF DESCRIPTION OF THE DRAWINGS

The accompanying drawings, which are incorporated in and constitute a part of this specification, illustrate one or more implementations described herein and, together with the description, explain these implementations.

FIG. 5 is a top plan view of another exemplary multi-strand wire repair apparatus constructed in accordance with the inventive concepts disclosed herein.

FIG. 16 is a side elevational view of an exemplary adjustment mechanism constructed in accordance with the inventive concepts disclosed herein.

FIG. 17 is a side elevational view of a multi-strand wire suspended between two support members, the wire having a bird cage defect.

FIG. 18 is a top plan view of the apparatus of FIG. 5 in use on a multi-strand wire suspended between two support members.

FIG. 19 is a side elevational view of a multi-strand wire suspended between two support members after use of the apparatus of FIG. 18.

DETAILED DESCRIPTION OF EXEMPLARY EMBODIMENTS

Figure 1:
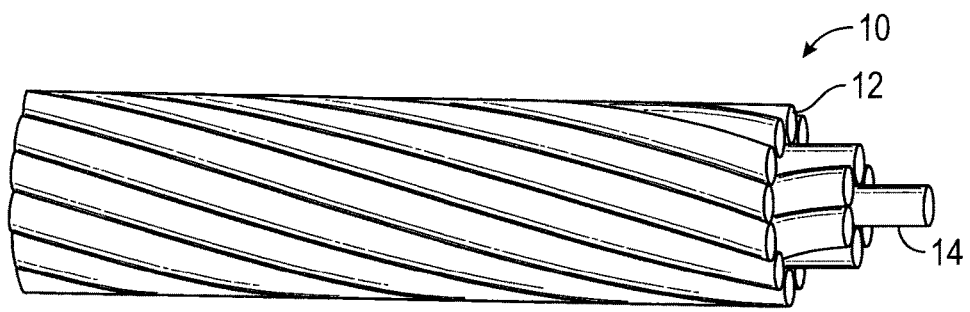
FIG. 1 is a perspective view of an exemplary multi-strand wire.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments, or of being practiced or carried out in various ways. Also, it is to be understood that the phraseology and terminology employed herein is for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having," and any variations thereof, are intended to cover a non-exclusive inclusion. For example, a process, method, article, or apparatus that comprises a list of elements is not necessarily limited to only those elements, and may include other elements not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B is true (or present).

In addition, use of the "a" or "an" are employed to describe elements and components of the embodiments disclosed herein. This is done merely for convenience and to give a general sense of the inventive concepts. This description should be read to include one or at least one and the singular also includes the plural unless it is obvious that it is meant otherwise.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

Finally, as used herein any reference to "one embodiment" or "an embodiment" means that a particular element, feature, structure, or characteristic described in connection with the embodiment is included in at least one embodiment. A particular element, feature, structure, or characteristic described in one embodiment may be combined with elements, features, structures, or characteristics of one or more other embodiment, unless expressly stated otherwise. The appearances of the phrase "in one embodiment" in various places in the specification are not necessarily all referring to the same embodiment.

Referring now to the drawings, an exemplary multi-strand wire 10 is shown in FIG. 1. The apparatuses and methods discussed herein may be applied with multiple types of multi-strand wire 10. Nonexclusive examples of multi-strand wire 10 include Aluminum Conductor Super Soft (ACSS) multi-strand wire, Aluminum Conductor Aluminum Alloy Reinforced (ACAR) multi-strand wire, and Aluminum Conductor Steel Reinforced (ACSR) multi-strand wire. A length of Aluminum Conductor Steel Reinforced (ACSR) multi-strand wire is shown in FIG. 1 by way of a non-limiting example. In one embodiment, the multi-strand wire 10 may be in the form of electrical transmission lines.

Figure 2:
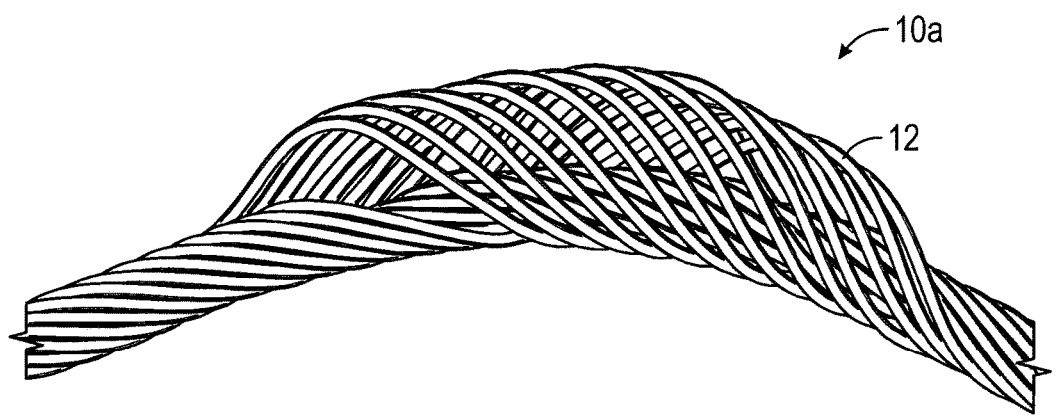
FIG. 2 is a side elevational view of an exemplary multi-strand wire with a bird cage defect.
Figure 3:
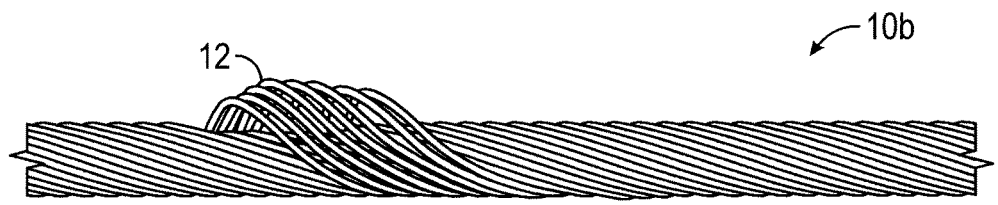
FIG. 3 is a side elevational view of another exemplary multi-strand wire with a bird cage defect.

The multi-strand wire 10 may comprise outer wire strands 12 of aluminum and an inner core 14 of steel. The aluminum outer wire strands 12 typically may have twice the thermal expansion rate of the steel inner core 14. Under a load, as the aluminum starts to lose strength, the load transfers to the inner core 14. When this happens, the aluminum outer wire strands 12 push on the steel inner core 14 causing elongation of one or more of the aluminum outer wire strands 12, resulting in radial deformation such as those known as bird cage defects, or bird caging. Other factors may also cause bird caging or other deformation of the outer wire strands 12 of the multi-strand wire 10, non-exclusive examples of which include bad blocks, rollers, travelers, grounds, hoists, and/or slings, and including multi-strand wire 10 having different composition than the exemplary multi-strand wire 10 described. FIGS. 2 and 3 show exemplary multi-strand wires 10a and 10b having bird cage defects.

Figure 4:
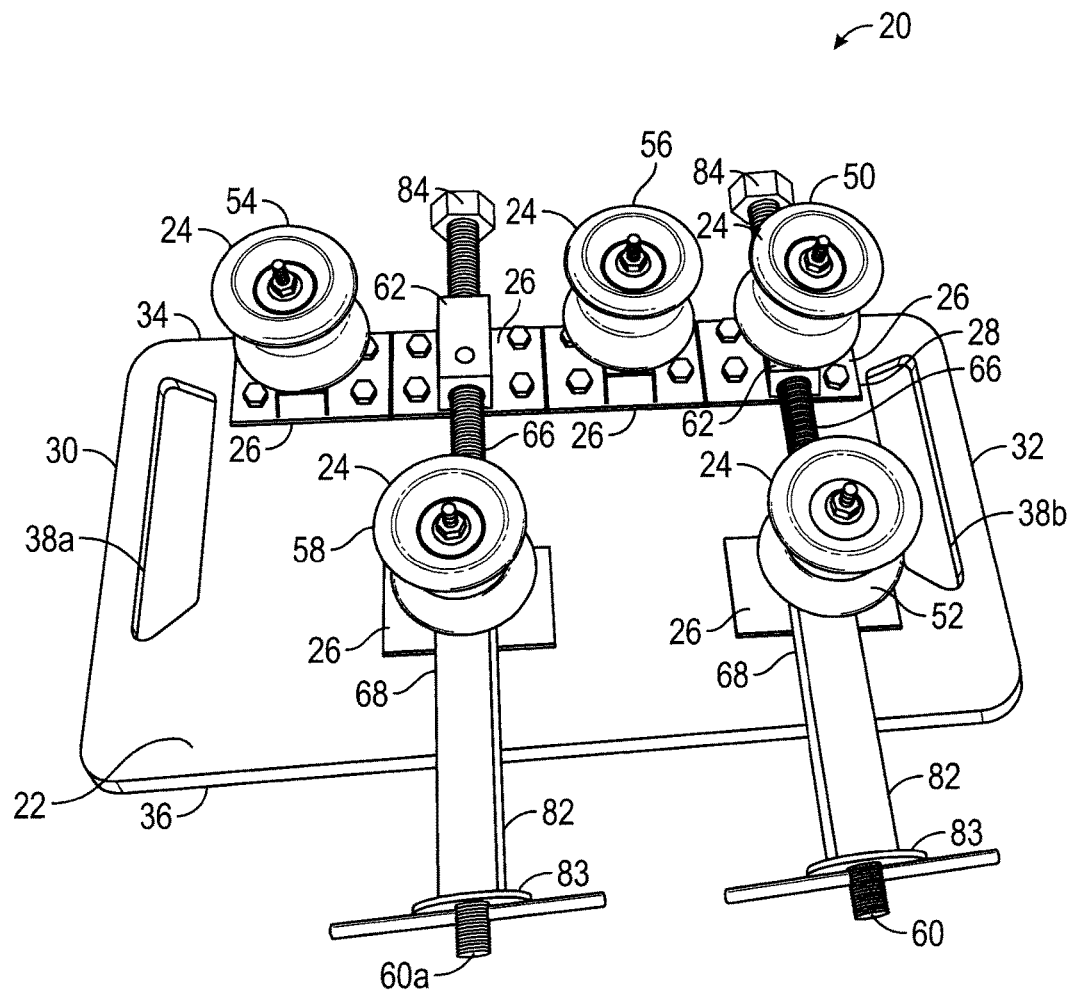
FIG. 4 is a perspective view of an exemplary multi-strand wire repair apparatus constructed in accordance with the inventive concepts disclosed herein.

FIGS. 4 and 5 illustrate exemplary repair apparatuses 20 and 20a for correcting radial deformation (bird caging) of multi-strand wire 10. Though the repair apparatus 20, 20a is described in conjunction with the repair of radial deformation and bird caging of multi-strand wire 10, it will be understood that the repair apparatuses 20, 20a may be used for other deformation of multi-strand wire 10 in which the outer wire strands 12 are outwardly deformed from the inner core 14 of the multi-strand wire 10.

The repair apparatuses 20, 20a may comprise a base 22 and two or more rollers 24 rotatably connected to the base 22 and/or to other components of the repair apparatus 20, 20a. In one embodiment, one or more of the rollers 24 may be rotatably attached to one or more plates 26 that are connected to the base 22. In one embodiment, one or more of the rollers 24 may be rotatably connected to one or more sleeves 28 that are movably or stationarily connected to the base 22 and/or the plates 26 and/or are movable in relation to the base 22.

The base 22 may have a first end 30, a second end 32, and a first side 34 and a second side 36 extending between the first end 30 and the second end 32. The base 22 may be rectangular in shape or may have another shape. The base 22 may be constructed of an electrically non-conductive material. One nonexclusive example of a non-conductive material is non-conductive voltage-rated neoprene.

The base 22 may have at least one handle formed into the base 22 and/or attached to the base 22. In one embodiment, the base has a first handle 38a proximate to the first end 30 of the base and a second handle 38b proximate to the second end 32 of the base.

Figure 6A:
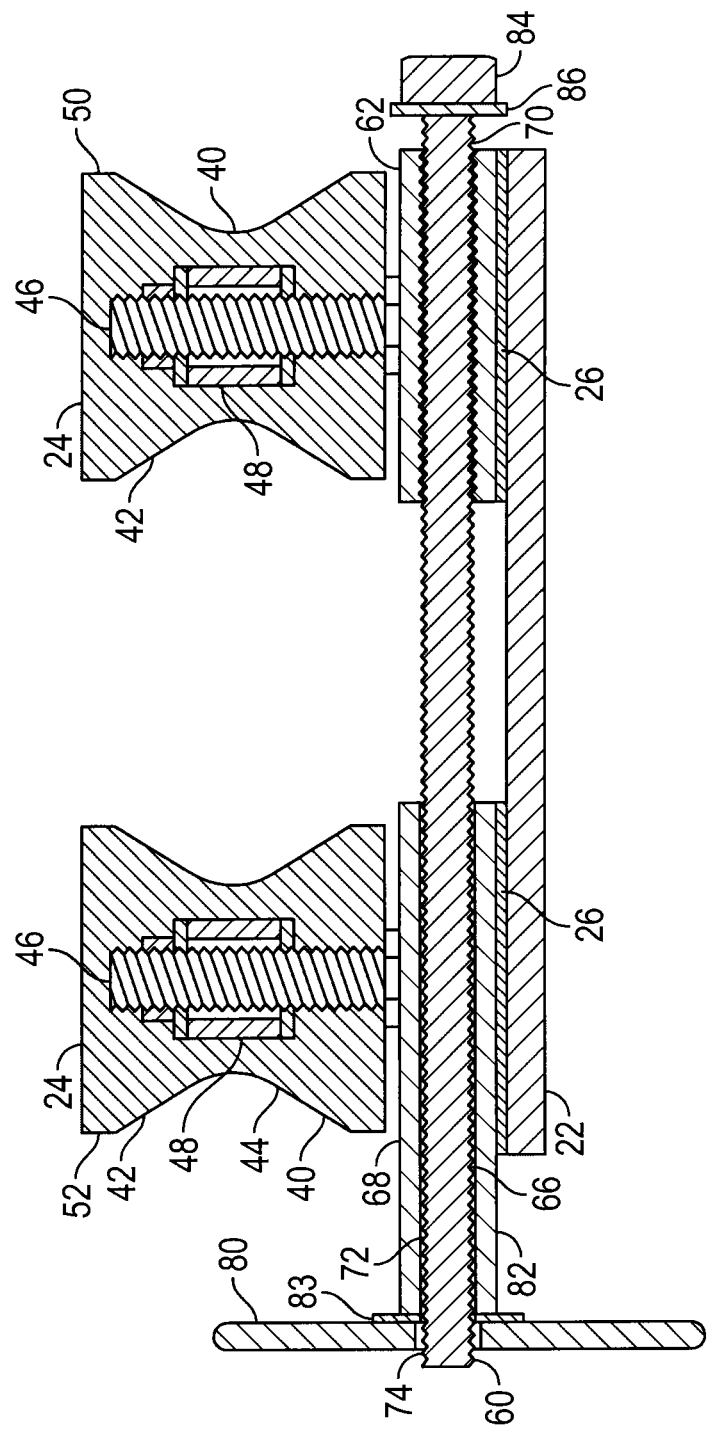
FIG. 6A is a cross-sectional side elevational view taken along line 6A-6A of the multi-strand wire repair apparatus of FIG. 5.
Figure 6B:
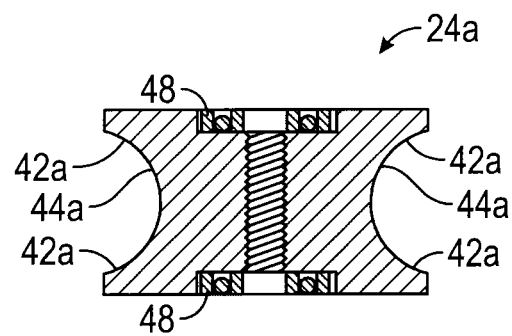
FIG. 6B is a cross-sectional side elevational view of an exemplary roller constructed in accordance with the inventive concepts disclosed herein.

As shown in FIGS. 6A and 6B, the rollers 24 may be grooved to fit a particular desired radius of multi-strand wire 10, such as the manufactured radius of the multi-strand wire 10. The rollers 24 may be grooved to fit a range of desired radii. Each of the two or more rollers 24 may have an annular groove 40 with a concave configuration such that a length of radially deformed multi-strand wire 10 is reformed when the rollers 24 are rolled over the length of the radially deformed multi-strand wire 10, thus correcting bird cage defects. In one embodiment, the annular groove 40 may have a concave configuration having one or more radii. One or more of the radii may be substantially the same as the desired radius of the multi-strand wire 10.

In one embodiment, the annular groove 40 of the rollers 24 may have a straight and/or angled outer portion 42 and a curved inner portion 44, such that the multi-strand wire is guided by the outer portion 42 to the inner portion 44 of the groove 40. The radius of the inner portion 44 may be substantially the same as, or slightly larger than, the desired radius of the multi-strand wire 10.

In one embodiment, the rollers 24 may be removable and may be exchanged for other rollers 24 having a different size/shape groove 40. In one embodiment, the repair apparatus 20 may be chosen, based at least in part on the size/shape of the groove 40 of the rollers 24 and the radius of the multi-strand wire 10, from multiple repair apparatuses 20 having rollers 24 with differing sized/shaped grooves 40. In one embodiment, the rollers 24 may be sized to reform different size ranges of multi-strand wire 10 for electrical transmission, such as 300-500 kcm, 500-900 kcm, 900-1500 kcm, 1500-2100 kcm, 2100-2500 kcm, and so on. Though it will be understood that the rollers 24 may be sized to fit other multi-strand wire 10 and/or other ranges.

The rollers 24 may be comprised of electrically non-conductive material. The rollers 24 may be made of a non-marring polymer. The rollers 24 may be made of polyvinyl chloride (PVC). The rollers 24 may be made of one or more materials that have enough rigidity to substantially maintain the shape of the roller 24 without damaging the multi-strand wire 10. Undesirable damage caused by the roller 24 to the multi-strand wire 10 includes, but is not limited to, flattening round outer wire strands 12 of the multi-strand wire 10 and/or creating divots or pock-marks in the multi-strand wire 10.

In one embodiment, one or more of the rollers 24 is rotatably connected to the base 22 with a bolt 46 extending from the base 22 or a sleeve on the base 22 into one or more internal bearing 48 within the roller 24. It will be understood that the rollers 24 may be rotatably connected in other ways, such as rotating on a shaft (not shown) or the bolt 46 without the bearing 48.

FIG. 6B illustrates another embodiment of roller 24a. The roller 24a may have an annular groove 40a with a curved outer portion 42a and a curved inner portion 44a. The multi-strand wire 10 is guided by the curved outer portion 42a to the curved inner portion 44a of the groove 40a. In one embodiment, the radius of the inner portion 44a may be substantially the same as, or slightly larger than, the desired radius of the multi-strand wire 10 for forming the desired radius of the multi-strand wire 10. In one embodiment, the radius of the curved inner portion 44a may be approximately seventy-five percent of the radius of the curved outer portion 42a. The larger radius of the outer portion 42a may first contact the deformation of the multi-strand wire 10, then, as the multi-strand wire 10 is re-formed by the roller 24a, the inner portion 44a may contact the remaining deformation of the multi-strand wire.

Non-exclusive examples of dimensions of rollers 24a include the following: the curved outer portion 42a having a radius of approximately one inch and the curved inner portion 44a having a radius of approximately ¾ inch; the curved outer portion 42a having a radius of approximately ⅞ inch and the curved inner portion 44a having a radius of approximately 21/32 inch; the curved outer portion 42a having a radius of approximately ¾ inch and the curved inner portion 44a having a radius of approximately 9/16 inch; the curved outer portion 42a having a radius of approximately ⅝ inch and the curved inner portion 44a having a radius of approximately 15/32 inch; and the curved outer portion 42a having a radius of approximately ½ inch and the curved inner portion 44a having a radius of approximately ⅜ inch. Of course, it will be understood that other dimensions may be used to reform the multi-strand wire 10 to a desired radius.

In one embodiment, the roller 24a may have one or more bearing 48, such as a first bearing 48 positioned proximate to the top of the roller 24a and a second bearing 48 positioned proximate to the bottom of the roller 24a.

The rollers 24, 24a have a length which may be chosen based at least in part on the diameter of the multi-strand wire 10 to be re-formed.

As exemplified in FIGS. 4, 5, and 6A in some embodiments, the rollers 24 may be a first roller 50 and a second roller 52 rotatably connected to the base 22. The first and second rollers 50, 52 may be in a spaced apart relationship, laterally aligned with and offset from one another.

In one embodiment, the rollers 24 may further comprise a third roller 54, a fourth roller 56, and a fifth roller 58 rotatably attached to the base 22. The third, fourth, and fifth rollers 54, 56, 58 may be in a spaced apart relationship. The third and fourth rollers 54, 56 may be substantially longitudinally aligned. The fifth roller 58 may be positioned between and laterally offset from the third roller 54 and the fourth roller 56.

In one embodiment, the first, third, and fourth rollers 50, 54, 56 may be initially positioned adjacent to the first side 34 of the base 22 and the second and fifth rollers 52, 58 may be initially positioned adjacent to the second side 36 of the base 22.

In one embodiment, the repair apparatus 20, 20a may further comprise at least one lateral adjustment mechanism 60 for adjusting the lateral position of at least one of the first and second rollers 50, 52, thereby changing the lateral offset between the first roller 50 and the second roller 52.

In one embodiment, the at least one lateral adjustment mechanism 60 may adjust the lateral position of at least one of the first and second rollers 50, 52, and/or of the third, fourth, and fifth rollers 54, 56, 58, thereby changing the lateral offsets between the first roller 50 and the second roller 52 and/or between the third and fourth roller 54, 56 and the fifth roller 58.

Figure 7:
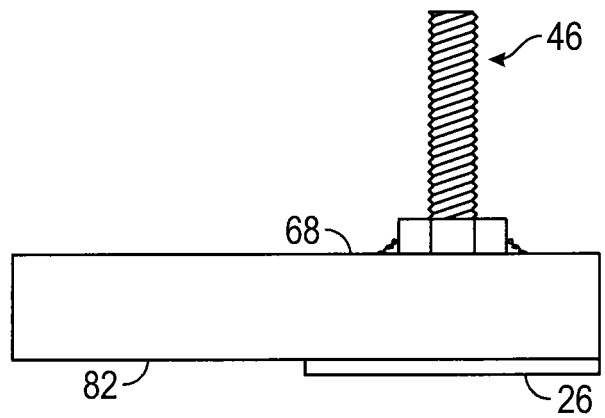
FIG. 7 is a side elevational view of an exemplary moveable sleeve constructed in accordance with the inventive concepts disclosed herein.
Figure 8:
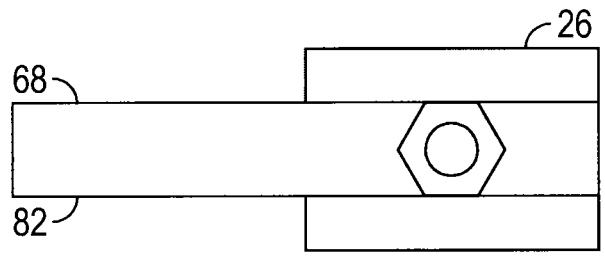
FIG. 8 is a top plan view of the exemplary moveable sleeve of FIG. 7.
Figure 9:
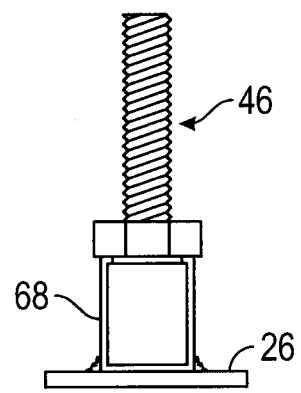
FIG. 9 is an end elevational view of the exemplary moveable sleeve of FIG. 7.
Figure 10:
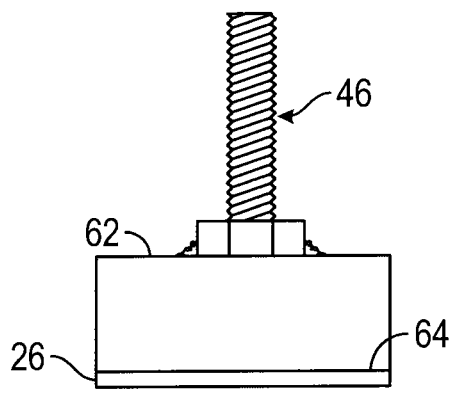
FIG. 10 is a side elevational view of an exemplary stationary sleeve constructed in accordance with the inventive concepts disclosed herein.
Figure 11:
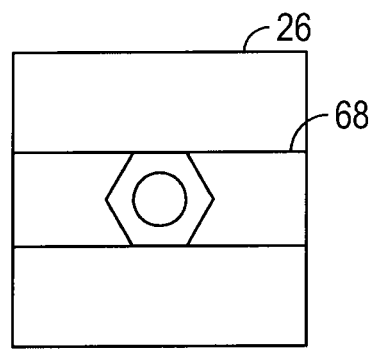
FIG. 11 is a top plan view of the exemplary stationary sleeve of FIG. 10.
Figure 12:
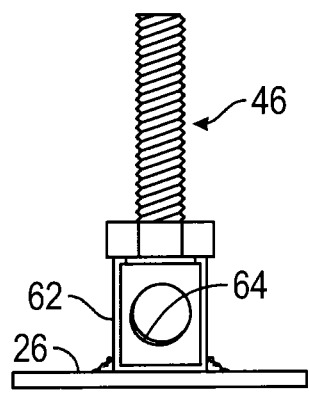
FIG. 12 is an end elevational view of the exemplary stationary sleeve of FIG. 10.
Figure 13:
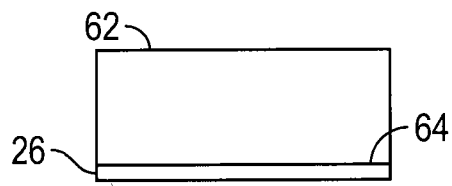
FIG. 13 is a side elevational view of another exemplary stationary sleeve constructed in accordance with the inventive concepts disclosed herein.
Figure 14:
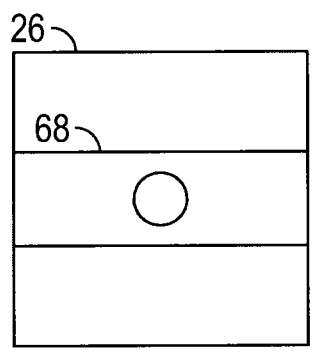
FIG. 14 is a top plan view of the exemplary stationary sleeve of FIG. 13.
Figure 15:
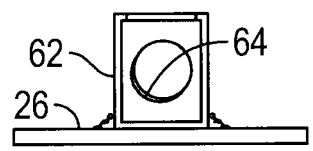
FIG. 15 is an end elevational view of the exemplary stationary sleeve of FIG. 13.

In one embodiment, the lateral adjustment mechanism 60 may adjust the lateral position of the second roller 52. As illustrated in FIGS. 4 and 5, the lateral adjustment mechanism 60 may comprise a stationary sleeve 62 having a threaded bore 64 (FIGS. 10-12), a screw member 66, and a moveable sleeve 68 (FIGS. 7-9). The second roller 52 may be rotatably connected to the moveable sleeve 68. In one embodiment, the moveable sleeve 68 may be moveable in relation to the base 22, but not connected directly to the base 22.

The stationary sleeve 62 may be positioned such that the threaded bore 64 is laterally aligned with the second roller 52. The stationary sleeve 62 may be connected to the base 22 and/or formed in the base 22. In one embodiment, the stationary sleeve 62 is connected to the one or more plate 26 which is connected to the base 22.

As shown in FIGS. 4-6 and 16, the screw member 66 may have a first end portion 70, a middle portion 72, and a second end portion 74. The first end portion 70 may be positioned in the threaded bore 64 of the stationary sleeve 62. The middle portion 72 may be positioned through the moveable sleeve 68. In one embodiment, the screw member 66 may be rotated such that the first end portion 70 progresses through the stationary sleeve 62, thereby laterally moving the moveable sleeve 68 and the attached second roller 52. Thus, the lateral position of the second roller 52 may be adjusted in relation to the first roller 50.

In one embodiment, the second end portion 74 of the screw member 66 may be attached to a screw handle 80 such that the screw member 66 may be rotated by rotating the screw handle 80. One nonexclusive example of a screw handle 80 is a T-handle. Of course, it will be understood that the screw member 66 may be rotated with other mechanisms well known to those having skill in the art.

In one embodiment, as illustrated in FIG. 4, the lateral adjustment mechanism 60 may further comprise a moveable push member 82 between the second end portion 74 of the screw member 66 and the moveable sleeve 68. In one embodiment, as shown in FIGS. 7-9, the push member 82 may be part of the moveable sleeve 68. In one embodiment, the lateral adjustment mechanism 60 may further comprise one or more washer 83 between the screw handle 80 and the push member 82 to assist in preventing binding. In the embodiment of FIG. 4, the screw member 66 may progress through the stationary sleeve 62, while laterally moving the moveable sleeve 68, and thus moving the second roller 52 that is attached to the moveable sleeve 68.

In one embodiment, as illustrated in FIGS. 5, 6, and 16, the threaded bore 64 of the stationary sleeve 62 is a through-bore and the first end portion 70 of the screw member 66 may extend through the threaded bore 64 of the stationary sleeve 62. In one embodiment, the lateral adjustment mechanism 60 may further comprise a nut 84 and may comprise a washer 86 attachable to the first end portion 70 of the screw member 66 when the screw member 66 is extended through the threaded bore 64 of the stationary sleeve 62.

In one embodiment, the moveable sleeve 68 may have a threaded bore and the stationary sleeve 62 may have a non-threaded bore. The screw member 66 may extend through the moveable sleeve 68 and the stationary sleeve 62. The screw member 66 may be secured in position with the nut 84 and washer 86 attachable to the first end portion 70 of the screw member 66. Thus, when the screw member 66 is rotated, the movement of the screw member 66 in the threaded bore of the moveable sleeve 68 laterally moves the moveable sleeve 68, and thereby the second roller 52.

It will be understood that the lateral adjustment mechanism 60 may comprise other, fewer, or more components, or be constructed in alternate manners, as long as the lateral position of at least one of the rollers 24 may be laterally adjusted. In one embodiment, the lateral adjustment mechanism 60 may be automated.

Though the lateral movement of the second roller 52 is described for clarity of example, lateral adjustment mechanisms may be used for any of the rollers 24. It will be understood that one, two, or more than two adjustment mechanisms may be used to adjust the lateral position of the rollers 24.

In one embodiment, the lateral adjustment mechanism 60 may be a first lateral adjustment mechanism, and the repair apparatus 20 may further comprise a second lateral adjustment mechanism 60a for adjusting the lateral position of the fifth roller 58. The second lateral adjustment mechanism 60a may be substantially similar to the first lateral adjustment mechanism 60. However, since the fifth roller 58 is offset between the third and fourth rollers 54, 56, the stationary sleeve 62 of the second lateral adjustment mechanism 60a may be connected to the base 22 and/or the one or more plate 26 connected to the base 22 between the third roller 54 and the fourth roller 56, as illustrated in FIGS. 4, 5, and 13-15, and the fifth roller 58 may be rotatably connected to the moveable sleeve 68 of the second lateral adjustment mechanism 60a.

Referring now to FIGS. 4, 5, and 17-19, a method of correcting radial deformation of multi-strand wire 10 using the repair apparatus 20, 20a will be described. In one embodiment, the repair apparatus 20, 20a may be used in electrical transmission wire applications. The multi-strand wire 10 may be suspended between a first support member 90 and a second support member 92, and/or connected to one or more support member 90, 92. The multi-strand wire 10 may be adapted to carry an electrical current.

FIG. 17 illustrates an example of a multi-strand wire 10 connected to an end body 94 that was pressed on the multi-strand wire 10. The end body 94 may be connected to the first support member 90. FIG. 17 further illustrates bird caging (radial deformation) of the multi-strand wire 10 in a portion of the multi-strand wire 10 which may be caused, for example, by compression of the end body 94 on the multi-strand wire 10 during the attachment of the end body 94.

The repair apparatus 20, 20a may be positioned on the multi-strand wire 10 suspended between the two support members 90, 92 such that the multi-strand wire 10 is positioned substantially linearly in the lateral offset between the first and second rollers 50, 52. The repair apparatus 20, 20a may be positioned initially such that the multi-strand wire 10 and/or the end body 94 (or other end/sleeve/etc.) is positioned in the lateral offset between the fifth roller 58 and the third and fourth rollers 54, 56. In one embodiment, the first and second rollers 50, 52 assist in moving the multi-strand wire As illustrated in FIG. 18, the repair apparatus 20, 20a may then be moved over a radially deformed length of the multi-strand wire 10 such that a first side 96 of the multi-strand wire 10 is received in the annular groove 40 of the first roller 50 and a second side 98 of the multi-strand wire 10 is received in the annular groove 40 of the second roller 52. The first side 96 of the multi-strand wire 10 may also be received in the annular groove 40 of the third and fourth rollers 54, 56, and the second side 98 of the multi-strand wire 10 may also be received in the annular groove 40 of the fifth roller 58. Rolling the rollers 24 over the length of the radially deformed multi-strand wire 10 reforms the radially deformed multi-strand wire 10.

In one embodiment, the first and second rollers 50, 52 assist in moving the multi-strand wire 10 into position and reduce deformation of the multi-strand wire 10 as the first and second rollers 50, 52 move over the multi-strand wire 10. In one embodiment, the fifth roller 58 and the third and fourth rollers 54, 56 reduce deformation of the multi-strand wire 10 as the fifth roller 58 and the third and fourth rollers 54, 56 move over the multi-strand wire 10.

The repair apparatus 20, 20a may be moved over the length of the radially deformed multi-strand wire 10 multiple times to repair the multi-strand wire 10. Each pass of the apparatus 20 may reform the multi-strand wire 10 more closely to the desired radial shape, that is, to the shape substantially similar to the shape of the multi-strand wire 10 as manufactured, as shown in FIG. 19.

In one embodiment, the user may use the one or more handles 38a, 38b to move the apparatus 20 over the multi-strand wire 10. The user may directly grasp one or more of the handles 38a, 38b and/or may use an electrically non-conductive tool (not shown) to engage one or more of the handles 38a, 38b to move the apparatus 20 over the multi-strand wire 10. In situations in which the multi-strand wire 10 is adapted to carry an electrical current, the user may use the one or more electrically non-conductive tool (not shown) to move the apparatus 20.

As shown in FIG. 18, in one embodiment, initially, the first and second sides 96, 98 of the multi-strand wire are only partially received in the grooves 40 of the first and second rollers 50, 52, or the first, second, third, fourth, and fifth rollers 50, 52, 54, 56, 58 due to the size of the radial deformation. As the rollers 24 are rolled over the multi-strand wire 10, the multi-strand wire 10 is partially reformed. Then the multi-strand wire 10 may be more fully received in the grooves 40 of the rollers 24, thereby further reforming the multi-strand wire 10 when the rollers 24 are rolled over the length of the multi-strand wire 10.

In one embodiment, the repair apparatus 20, 20a may be positioned on the radially deformed multi-strand wire 10 that is suspended between two support members 90, 92 such that the multi-strand wire 10 is positioned substantially linearly in the lateral offset between the first roller 50 and second roller 52, and positioned substantially linearly in the lateral offset between the fifth roller 58 and the third and fourth rollers 54, 56.

In one embodiment in which the end body 94 (or other body/sleeve/etc.) is pressed onto the multi-strand wire 10, as shown in the examples of FIGS. 17-19, the repair apparatus 20, 20a may be initially partially positioned on the multi-strand wire 10. For example, initially, the repair apparatus 20, 20a may be positioned such that the third and fourth rollers 54, 56 are on a first side of the end body 94 and the fifth roller 58 is on a second side of the end body 94, and the multi-strand wire 10 may be positioned substantially linearly in the lateral offset between just the first and second rollers 50, 52. This allows the first and second rollers 50, 52 to begin reforming the multi-strand wire 10 directly adjacent to the end body 94. Then, as the apparatus 20, 20a is moved over the multi-strand wire 10, the third, fourth, and fifth rollers 54, 56, 58 are also rolled over the length of the multi-strand wire 10, further reforming the multi-strand wire 10, and/or stabilizing the apparatus 20, 20a on the multi-strand wire 10.

In one embodiment, initially the repair apparatus 20, 20a may be positioned such that the first roller 50 is on one side of the end body 94 and the second roller 52 is on the other side of the end body 94, and the multi-strand wire 10 may be positioned substantially linearly in the lateral offset between the third and fourth rollers 54, 56 and the fifth roller 58. This allows the third, fourth, and fifth rollers 54, 56, 58 to begin reforming the multi-strand wire 10 directly adjacent to the end body 94. Then, as the apparatus 20, 20a is moved over the multi-strand wire 10, the first and second rollers 50, 52 are also rolled over the length of the multi-strand wire 10, further reforming the multi-strand wire 10, and/or stabilizing the apparatus 20, 20a on the multi-strand wire 10.

In one embodiment, after an initial reformation of the multi-strand wire 10 by the first and second rollers 50, 52 while the third, fourth, and fifth rollers 54, 56, 58 are positioned on the end body 94, the lateral position of at least one of the third, fourth, and fifth rollers 54, 56, 58 may be adjusted to narrow the lateral offset between the fifth roller 58 and the third and fourth rollers 54, 56.

In one embodiment, after an initial reformation of the multi-strand wire 10 by the third, fourth, and fifth rollers 54, 56, 58 while the first and second rollers 50, 52 are positioned on the end body 94, the lateral position of at least one of the first and second rollers 50, 52 may be adjusted to narrow the lateral offset between the first roller 50 and the second roller 52.

The repair apparatus 20, 20a may be moved over the length of the multi-strand wire 10 more than once, further reforming the multi-strand wire 10.

In one embodiment, the lateral position of at least one of the rollers 24 may be adjusted to change the lateral offset between the rollers 24 before the first positioning of the repair apparatus 20, 20a.

In one embodiment, the lateral position of at least one of the rollers 24 may be adjusted to change the lateral offset between the rollers 24 after the rollers 24 initially pass over the multi-strand wire 10. In one embodiment, the lateral offset is decreased, and the repair apparatus 20, 20a is rolled over the multi-strand wire 10, thus further reforming the multi-strand wire 10 and decreasing the bird cage defect. As the repair apparatus 20, 20a is rolled over the multi-strand wire 10 and the bird cage defect in the multi-strand wire 10, the radially deformed wires may be reformed incrementally. This process may be repeated until the bird cage defect is eliminated from the multi-strand wire 10.

In one embodiment, the repair apparatus 20, 20a may be positioned on a portion of the multi-strand wire 10 that does not exhibit a bird cage defect and then rolled across a portion of the multi-strand wire 10 that does exhibit the bird cage defect, thus moving the radially deformed wires back into position in the multi-strand wire 10.

In one embodiment, the lateral position of at least one of the first, second, third, fourth, and fifth rollers 50, 52, 54, 56, 58 may be adjusted with the first and/or second lateral adjustment mechanism 60, 60a. A user may rotate the screw member 66 to laterally move one or more of the rollers 24. In one embodiment, the user may adjust the lateral position of the second roller 52. In one embodiment, the user may adjust the lateral position of the second roller 52 and/or the fifth roller 58.

In one embodiment, the distance of the lateral offset of the first roller 50 to the second roller 52 may be different than the distance of the lateral offset of the third and fourth rollers 54, 56 to the fifth roller 58.

The repair apparatus 20, 20a may be used to correct radial deformation of the multi-strand wire 10 while the multi-strand wire 10 is connected to and suspended between two or more support members 90, 92. The multi-strand wire 10 may be electrically connected while the repair apparatus 20, 20a is used to correct the radial deformation.

In one embodiment, a method of correcting radial deformation of multi-strand wire 10 using the repair apparatus 20, 20a may comprise one or more of the following steps:

Identify one or more deformation (e.g., radial bird cage defect) in the multi-strand wire 10.

Verify the desired diameter of the multi-strand wire 10.

Obtain the repair apparatus 20, 20a with appropriately sized length and radii of the groove 40 in the rollers 24 for the diameter of the multi-strand wire 10.

Remove rigging, hoists, grips, line hoses, tie ropes, and other obstructions from the multi-strand wire 10.

Verify that the portion of the multi-strand wire 10 where the repair apparatus 20, 20a will be positioned and will roll over and the grooves 40 of the rollers 24 are free from debris.

Adjust the lateral offset between the first and second rollers 50, 52 to a distance that is less than the diameter of the radial deformation of the multi-strand wire 10. The distance may be greater than the desired diameter of the multi-strand wire 10.

In instances where an end body 94 or other attachment is located adjacent to the radial deformation, adjust the lateral offset between the fifth roller 58 and the third and fourth rollers 54, 56 (and/or the lateral offset between the first roller 50 and the second roller 52), to a distance matching the diameter of the end body 94 or other attachment.

In instances where no attachment is located adjacent to the radial deformation, adjust the lateral offset between the fifth roller 58 and the third and fourth rollers 54, 56 and/or the lateral offset between the first roller 50 and the second roller 52, to a distance that is less than the diameter of the radial deformation of the multi-strand wire 10. The distance may be greater than the desired diameter of the multi-strand wire 10. The lateral offset between the fifth roller 58 and the third and fourth rollers 54, 56 may be different or substantially the same as the lateral offset between the first roller 50 and the second roller 52.

Position the repair apparatus 20, 20a on the multi-strand wire 10 such that the multi-strand wire 10 is positioned substantially linearly in the lateral offset between the first and second roller 50, 52, and such that the end body 94 or other attachment is positioned substantially linearly in the lateral offset between the fifth roller 58 and the third and fourth rollers 54, 56 (in cases where such attachments are in place, otherwise, the multi-strand wire 10 will be positioned substantially linearly in the lateral offset between the fifth roller 58 and the third and fourth rollers 54, 56). Alternatively, position the repair apparatus 20, 20a on the multi-strand wire 10 such that the multi-strand wire 10 is positioned substantially linearly in the lateral offset between the fifth roller 58 and the third and fourth rollers 54, 56, and such that the end body 94 or other attachment is positioned substantially linearly in the lateral offset between the first and second roller 50, 52.

Move the repair apparatus 20, 20a toward the deformation of the multi-strand wire 10 (i.e. toward the radial bird cage defect).

Move the repair apparatus 20, 20a over the length of the deformation such that the first side of the multi-strand wire 10 is received in the groove 40 of the first roller 50 and the second side of the multi-strand wire 10 is received in the groove 40 of the second roller 52, and/or first side of the multi-strand wire 10 is received in the groove 40 of the third and fourth rollers 54, 56 and the second side of the multi-strand wire 10 is received in the groove 40 of the fifth roller 58, thus reforming the multi-strand wire 10. In cases where there is an end body 94 or other attachment, the first, second, third, fourth, and/or fifth rollers 50,52, 54, 56, 58 may move over the end body 94 and onto the multi-strand wire 10.

Move the repair apparatus 20, 20a past the deformation on the multi-strand wire 10.

Move the repair apparatus 20, 20a in the opposite direction back over the length of the deformation such that the first side of the multi-strand wire 10 is received in the groove 40 of the first roller 50 (and/or the third and fourth rollers 56, 56) and the second side of the multi-strand wire 10 is received in the groove 40 of the second roller 52 (and/or the fifth roller 58), thus further reforming the multi-strand wire 10.

Repeat the movement of one or more of the rollers 24 of the repair apparatus 20, 20a over the deformation in the multi-strand wire 10.

If necessary to remove the deformation (i.e. further reform the multi-strand wire 10), adjust the lateral offsets between the rollers 24 to a smaller distance, such that the distance is closer to, or the same as, the desired diameter of the multi-strand wire 10.

If necessary to remove the deformation, repeat movement of the repair apparatus 20, 20a over the length of the bird cage defect.

Repeat steps as necessary until the deformation is worked out of the multi-strand wire 10 and the desired diameter and desired configuration of the multi-strand wire 10 is obtained.

In some uses, a back-and-forth motion of the repair apparatus 20, 20a over the bird cage defect of the multi-strand wire 10 may be utilized.

From the above description, it is clear that the inventive concepts disclosed herein are well adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished within the scope of the inventive concepts disclosed and claimed herein.

What is claimed is:

1. An apparatus for correcting deformation of multi-strand wire, comprising:
an electrically non-conductive base having a first end, a second end longitudinally positioned from the first end, a first side, a second side laterally positioned from the first side, the first and second sides extending between the first end and the second end, and a front surface;
a first stationary sleeve attached to the front surface of the base and positioned proximate to the first side of the base and having a threaded through-hole;
a first moveable sleeve positioned between the first stationary sleeve and the second side of the base and having a through-hole;
a first screw member having a first end portion engageable with the threaded through-hole of the first stationary sleeve, a middle portion positioned through the through-hole of the first moveable sleeve, and a second end portion having an adjustment handle, such that a lateral position between the first and second side of the base of the first moveable sleeve is adjustable in relation to the first stationary sleeve when the first end portion of the first screw member is screwed in the threaded through-hole of the first stationary sleeve via rotation of the adjustment handle;
a first roller rotatably attached to the first stationary sleeve, the first roller having an outer diameter with an annular groove having a concave configuration; and
a second roller rotatably attached to the first moveable sleeve and laterally aligned with the first roller and offset toward the second side of the base from the first roller, the second roller having an outer diameter with an annular groove having a concave configuration, such that a radially deformed multi-strand wire is re-formed when the first roller is rolled over a first side of the radially deformed multi-strand wire and the second roller is rolled over a second side of the radially deformed multi-strand wire;
a third roller having an outer diameter with an annular groove having a concave configuration and rotatably connected to the base proximate to the first side of the base;
a fourth roller having an outer diameter with an annular groove having a concave configuration and rotatably connected to the base and substantially longitudinally aligned with the third roller proximate to the first side of the base;
a second stationary sleeve connected to the base and positioned proximate to the first side of the base and between the third roller and the fourth roller and having a threaded through-hole;
a second moveable sleeve positioned between the second stationary sleeve and the second side of the base and having a through-hole;
a second screw member having a first end portion engageable with the threaded through-hole of the second stationary sleeve, a middle portion positioned through the through-hole of the second moveable sleeve, and a second end portion having an adjustment handle, such that a lateral position of the second moveable sleeve is adjustable in relation to the second stationary sleeve when the first end portion of the screw member is screwed through the threaded through-hole of the second stationary sleeve via rotation of the adjustment handle; and
a fifth roller having an outer diameter with an annular groove having a concave configuration and rotatably connected to the second moveable sleeve, the fifth roller positioned between and offset toward the second side from the third roller and the fourth roller, such that a radially deformed multi-strand wire is re-formed when the third roller and the fourth roller is rolled over the first side of the radially deformed multi-strand wire and the fifth roller is rolled over the second side of the radially deformed multi-strand wire.

2. The apparatus for correcting deformation of multi-strand wire of claim 1, wherein the first roller, the second roller, the third roller, the fourth roller, and the fifth roller comprise electrically non-conductive material.

3. The apparatus for correcting deformation of multi-strand wire of claim 1, wherein the base has a first handle positioned proximate to the first end of the base and a second handle positioned proximate to the second end of the base.

4. The apparatus for correcting deformation of multi-strand wire of claim 1, wherein the annular grooves of the first, second, third, fourth, and fifth rollers each have an outer portion having a first radius and an inner portion having a second radius.

5. The apparatus for correcting deformation of multi-strand wire of claim 4, wherein the first radius is larger than the second radius.

6. An apparatus for correcting deformation of multi-strand wire, comprising:
an electrically non-conductive base having a first end, a second end longitudinally positioned from the first end, a first side, and a second side laterally positioned from the first side, the first and second sides extending between the first end and the second end;
a first electrically non-conductive roller rotatably connected to the base proximate to the first side and having an outer diameter with an annular groove with a concave configuration;
a second electrically non-conductive roller having an outer diameter with an annular groove with a concave configuration and laterally aligned with the first roller and offset from the first roller toward the second side of the base such that a radially deformed length of a multi-strand wire is re-formed when the first roller is rolled over a first side of the radially deformed length of the multi-strand wire while the second roller is rolled over a second side of the radially deformed length of the multi-strand wire;
a first lateral adjustment mechanism connected to the second roller such that a lateral offset between the second roller and the first roller is adjustable;
a third electrically non-conductive roller, a fourth electrically non-conductive roller, and a fifth electrically non-conductive roller each having an annular groove with a concave configuration and rotatably connected to the base in a spaced apart relationship such that the third roller and the fourth roller are substantially longitudinally aligned and the fifth roller is positioned between and laterally offset from the third roller and the fourth roller such that the third roller and the fourth roller may be rolled over the first side of the radially deformed length of the multi-strand wire while the fifth roller may be rolled over the second side of the radially deformed length of the multi-strand wire; and
a second lateral adjustment mechanism connected to the fifth roller such that a lateral offset between the third and fourth roller and the fifth roller is adjustable.

7. The apparatus for correcting deformation of multi-strand wire of claim 6, wherein the first lateral adjustment mechanism comprises:
   a stationary sleeve positioned proximate to the first side of the base and having a threaded bore;
   a moveable sleeve positioned between the stationary sleeve and the second side of the base, the second roller rotatably connected to the moveable sleeve; and
   a screw member having a first end engaging the threaded bore of the stationary sleeve, a middle portion positioned through the moveable sleeve, and a second end having a screw handle, such that rotation of the screw member laterally moves the moveable sleeve in relation to the stationary sleeve.

8. The apparatus for correcting deformation of multi-strand wire of claim 6, wherein the second lateral adjustment mechanism comprises:
   a stationary sleeve positioned proximate to the first side of the base and having a threaded bore;
   a moveable sleeve positioned laterally between the stationary sleeve and the second side of the, the fifth roller rotatably connected to the moveable sleeve; and
   a screw member having a first end engaging the threaded bore of the stationary sleeve, a middle portion positioned through the moveable sleeve, and a second end having a screw handle, such that rotation of the screw member laterally moves the moveable sleeve in relation to the stationary sleeve.

9. A method for correcting deformation of multi-strand wire, comprising:
   obtaining an apparatus, comprising:
      an electrically non-conductive base having a first end, a second end longitudinally positioned from the first end, a first side, and a second side laterally positioned from the first side, the first and second sides extending between the first end and the second end;
      a first roller and a second roller rotatably attached to the base, the second roller laterally aligned with the first roller and offset toward the second side of the base from the first roller, wherein each of the first and second rollers has an outer diameter with an annular groove with a concave configuration; and
      a third roller, a fourth roller, and a fifth roller each having an outer diameter with an annular groove with a concave configuration and rotatably attached to the base in a spaced apart relationship such that the third roller and the fourth roller are substantially longitudinally aligned and the fifth roller is positioned between and laterally offset from the third roller and the fourth roller;
   positioning the apparatus on a multi-strand wire having a radially deformed length suspended between two support members such that the multi-strand wire is positioned substantially linearly in a lateral offset between the first and second rollers and in a lateral offset between the third and fourth roller and the fifth roller;
   moving the apparatus over the radially deformed length of the multi-strand wire such that a first side of the radially deformed length of the multi-strand wire is received in at least one of the grooves of the first, third, and fourth roller and the second side of the radially deformed length of the multi-strand wire is received in at least one of the grooves of the second and fifth rollers;
   rolling at least two of the first, second, third, fourth, and fifth rollers over the radially deformed length of the multi-strand wire whereby the radially deformed length of the multi-strand wire is re-formed; and
   moving the apparatus in the opposite direction over the radially deformed length of the multi-strand wire such that a first side of the radially deformed length of the multi-strand wire is received in at least one of the grooves of the first, third, and fourth roller and the second side of the radially deformed length of the multi-strand wire is received in at least one of the grooves of the second and fifth rollers, thus further reforming the multi-strand wire.

10. The method for correcting radial deformation in multi-strand wire of claim 9, further comprising:
    adjusting a position of at least one of the first and second rollers to decrease the lateral offset between the first and second rollers; and
    moving the apparatus with the adjusted position over the radially deformed length of the multi-strand wire such that the groove of the first roller rolls over the first side of the multi-strand wire and the groove of the second roller rolls over the second side of the multi-strand wire thereby re-forming the multi-strand wire to a desired diameter.

11. The method for correcting radial deformation in multi-strand wire of claim 10, wherein the step of adjusting the position of the at least one of the first and second rollers further comprises:
    adjusting the position of the at least one of the first and second rollers utilizing an adjustment mechanism, comprising:
       a stationary sleeve having a threaded bore;
       a moveable sleeve positioned between the base and the second roller; and
       a screw member having a first end engaging the threaded bore, a middle portion positioned through the moveable sleeve, and a second end having a screw handle.

12. The method for correcting radial deformation in multi-strand wire of claim 11, wherein after adjusting the position of at least one of the first and second rollers to narrow the lateral offset between the first and second rollers, the method further comprises:
    moving the apparatus again over the radially deformed length of the multi-strand wire such that the first side of the multi-strand wire is received in the groove of the first roller and the second side of the multi-strand wire is received in the groove of the second roller; and
    rolling the first and the second rollers over the radially deformed length of the multi-strand wire whereby the radially deformed length of the multi-strand wire is re-formed.

13. The method for correcting radial deformation in multi-strand wire of claim 9, wherein the base has at least one handle and wherein moving the apparatus comprises utilizing an electrically non-conductive tool to move the apparatus over the radially deformed length of the multi-strand wire.

14. The method for correcting radial deformation in multi-strand wire of claim 9, further comprising repeating the steps of the method until an outer diameter of the multi-strand wire is re-formed to a desired diameter and configuration.

15. The method for correcting radial deformation in multi-strand wire of claim 9, further comprising:
    adjusting a position of at least one of the third, fourth, and fifth rollers to decrease the lateral offset between the third and fourth rollers and the fifth roller.

16. The method for correcting radial deformation in multi-strand wire of claim 15, wherein adjusting the position of the fifth roller further comprises utilizing an adjustment mechanism comprising:
- a stationary sleeve having a threaded bore;
- a moveable sleeve positioned between the base and the fifth roller; and
- a screw member having a first end engaging the threaded bore, a middle portion positioned through the moveable sleeve, and a second end having a screw handle.

17. The method for correcting radial deformation in multi-strand wire of claim 15, wherein after adjusting the position of the at least one of the third, fourth, and fifth rollers, the method further comprises:
- moving the apparatus again over the radially deformed length of the multi-strand wire such that the first side of the multi-strand wire is received in at least one of the grooves of the first, third, and fourth roller and the second side of the multi-strand wire is received in at least one of the grooves of the second and fifth rollers; and
- rolling the first, second, third, fourth, and fifth rollers over the radially deformed length of the multi-strand wire, whereby the radially deformed length of the multi-strand wire is reformed.

18. The method for correcting radial deformation in multi-strand wire of claim 17, further comprising repeating the steps of the method until an outer diameter of the multi-strand wire is re-formed to a desired diameter and configuration.

* * * * *